(12) United States Patent
Baron et al.

(10) Patent No.: US 9,992,295 B2
(45) Date of Patent: Jun. 5, 2018

(54) COMMUNICATION METHOD IN A COMMUNICATION SEGMENT OF A NETWORK

(71) Applicant: Sercel, Carquefou (FR)

(72) Inventors: Julien Baron, Nort sur Erdre (FR); Jerome Laine, Sautron (FR); Christian Gregoire, La Chapelle sur Erdre (FR); Pierre Sagot, Nantes (FR); Jean-Pierre Houdusse, Suce-sur-Erdre (FR)

(73) Assignee: Sercel, Carquefou (FR)

( * ) Notice: Subject to any disclaimer, the term of this patent is extended or adjusted under 35 U.S.C. 154(b) by 152 days.

(21) Appl. No.: 14/741,919

(22) Filed: Jun. 17, 2015

(65) Prior Publication Data
US 2015/0365490 A1 Dec. 17, 2015

(30) Foreign Application Priority Data
Jun. 17, 2014 (EP) .................................... 14305926

(51) Int. Cl.
*H04L 29/08* (2006.01)
*H04L 29/06* (2006.01)
(52) U.S. Cl.
CPC .......... *H04L 67/2814* (2013.01); *H04L 67/12* (2013.01); *H04L 69/02* (2013.01); *H04L 69/03* (2013.01)
(58) Field of Classification Search
None
See application file for complete search history.

(56) References Cited

U.S. PATENT DOCUMENTS 6,459,654 B1 * 10/2002 Bary ........................ G01V 1/22
367/77
6,987,740 B1 1/2006 Di Benedetto et al.
(Continued)

FOREIGN PATENT DOCUMENTS

EP 1087240 A1 3/2001
EP 2657723 10/2013
WO 2013062949 A1 5/2013

OTHER PUBLICATIONS

European Search Report and Written Opinion dated Sep. 25, 2014 for corresponding European Patent Application No. EP 14305926, filed Jun. 17, 2014.
(Continued)

*Primary Examiner* — Natisha D Cox
(74) *Attorney, Agent, or Firm* — Ipsilon USA, LLP

(57) ABSTRACT

A communication method is provided in a communication network, including a plurality of devices forming an ordered communication segment. At least one intermediate device of this segment is connected to at most two other devices called a previous device and a next device. The intermediate device receives data from the previous device and emits at least these data to the next device to propagate the data on the segment. A concentrator initializes transmission of a first frame of data through the segment to a terminal device ending the segment, which sends back a symbol initiating transmission of a second frame of data to the first concentrator through the segment. The method includes receiving a first symbol from the previous device, which triggers emitting a WAIT symbol to the previous device and emitting at least first symbol to the next device.

11 Claims, 3 Drawing Sheets

(56) References Cited

U.S. PATENT DOCUMENTS

| | | | | |
|---|---|---|---|---|
| 2008/0144442 | A1* | 6/2008 | Combee | G01V 1/22 |
| | | | | 367/131 |
| 2008/0320154 | A1* | 12/2008 | Demmer | H04W 4/02 |
| | | | | 709/229 |
| 2010/0128564 | A1 | 5/2010 | Boucard | |
| 2010/0148940 | A1* | 6/2010 | Gelvin | H04L 67/12 |
| | | | | 340/286.02 |
| 2010/0214960 | A1* | 8/2010 | Bahr | H04L 45/00 |
| | | | | 370/255 |
| 2013/0201484 | A1* | 8/2013 | Goldner | G01V 1/226 |
| | | | | 356/460 |
| 2015/0109883 | A1* | 4/2015 | Vangasse | G01V 1/22 |
| | | | | 367/15 |

OTHER PUBLICATIONS

Perlman R Ed: "Interconnections: Bridges and routers", Jan. 1, 1992, pp. 43-74, XP002170416, ISBN: 978-0-201-56332-0.
Troan R Droms Cisco Systems: "IPv6 Prefix Option for Dynamic Host Configuration Protocol (DHCP) version 6; rfc3633.txt", Dec. 1, 2003, XP015009415.
Cuneyt Akinlar Sarit Mukherjee: "Mini-DHCP Election Option for DHCOP; draft-akinlar-zeroconf-minidhcp-option-00/txt" May 1, 2000, XP015009984.
Johnson K Kinnear Cisco Systems R et al: "Description of Cisco Systems Subnet Allocation Option for DHCPv4; rfc6656" Jul. 20, 2012, pp. 1-24, XP015086391.
European Office Action dated Jan. 24, 2018.

\* cited by examiner

COMMUNICATION METHOD IN A COMMUNICATION SEGMENT OF A NETWORK

1. FIELD OF THE DISCLOSURE

The field of this disclosure is the communication of data propagating through a line of devices. More precisely, the disclosure relates to the adaptation to network topology changes, due to a line cut or an equipment failure, layout or removal.

2. BACKGROUND OF THE DISCLOSURE

The disclosure relates to a communication network where data are provided by devices and in which nodes exchange data via wired link. The disclosure may be implemented in a communication network for seismic data acquisition systems in which nodes are connected with seismic sensors. In this application, seismic sensors disposed on the Earth's surface receive seismic wave trains resulting from emission into the ground by a seismic source. Treatment of these reflections can build a map of the subsoil prospected. The present disclosure is usable for the oil exploration industry using seismic methods.

However, the disclosure is not limited to the particular field of oil exploration industry and may be used in any data acquisition system in which data acquired by each node in the network is transmitted and received by other nodes using wired links.

In the case of data acquisition systems comprising seismic sensors, these devices are connected together in strings by cables to an electronic unit named a "node". These nodes are usually placed in lines and managed by devices, also referred to as "concentrators". A set of a plurality of nodes surrounded by concentrators at each end is called a "segment". A node may also end the segment. Each concentrator locally manages communication on a segment, and provides the power supply to the nodes. Concentrators communicate with a central unit that controls all devices and centralizes the data transmitted over the communication network.

When the devices are placed and connected, they are turned off. The activation of each unit is performed by successively turning on the power supply according to the propagation of electric voltage. Following its powering on, the device is activated and sends back a signal to the device that provided its power supply, i.e. the previous device, this signal being iteratively propagated towards the beginning of the segment. The concentrator placed at the beginning of the segment receives the frame corresponding to each node switching on and may thus count the number of nodes connected to this segment. If an identifier of each node is transmitted, the concentrator may also identify each node in its segment. The concentrator then sends a new activation signal and a new device is switched on. These operations are repeated until the end of the segment is found or another concentrator is reached. To turn on the entire network, each node is individually switched on and then; data can get over this node and reach the rest of the segment. The above procedure results in a time consuming initialization phase for turning on the network.

A super frame is defined as the appending of a control frame, successive data frames and an end of super frame symbol, with a size of super-frame fixed to the maximum node count specified for the system.

Document EP 1087240 discloses a seismic data acquisition system according to the prior art. As also disclosed in EP 1087240, such a network may comprise many concentrators connected to a greater number of nodes. At any time, operators may disconnect some cables to install new nodes or concentrators: the network topography may often change. Moreover, the cables may be partially or completely cut due to environmental stresses, thus isolating some portions of some segments. To overcome this problem, it has been proposed to implement the data acquisition system in main acquisition line (comprising the segments) interconnected by secondary transverse line also connected to the central unit. The use of main and secondary transverse line builds loops and allows multiple paths to transmit the data. Thus, loops topography may avoid lines cut transmission issues. The events affecting the topography network may frequently occur, therefore it is necessary to have a network whose topography is dynamically managed and that is able at any time to detect cuts and transmit data by other paths. In some regions, after a night of inactivity, rodents may damage the network (cable or device). The duration to restart the network system may take a long time, sometimes several hours. This time is very expensive for operators.

3. SUMMARY OF THE DISCLOSURE

The disclosure, in at least one embodiment, is aimed especially at overcoming these different drawbacks of the prior art.

A particular embodiment of the disclosure proposes a communication method in a communication network comprising a plurality of intermediary devices forming an ordered communication segment ended by a terminal device and a first concentrator. Intermediary devices of this segment are connected to at most two other devices among said intermediary devices, terminal device and concentrator, the two other devices being called previous device and next device. At least one intermediary device receives data from the previous device and emitting at least these data to the next device allowing the propagation of the data on the segment. The first concentrator of the segment initializes the transmission of a first frame of data through the segment to the terminal device; the terminal device sends back a symbol initiating the transmission of a second frame of data to the first concentrator through the segment.

Basically, a super frame is defined as the appending of a control frame, successive data frames and an end symbol (end of super frame EOSF).

The communication method comprises following steps carried out by at least an intermediary device of the segment: receiving a first symbol EOSF from the previous device of the intermediary device, this receiving step triggering a step of emitting a WAIT symbol to the previous device and a step of emitting of the at least first symbol EOSF to the next device.

As a result, a device is quickly informed when the wired link with the next device is cut by having a WAIT symbol detection time out, and it may send this information to the concentrator managing the segment.

According to a first implementation, emitting of WAIT symbol is periodically spaced out of a duration less than a first determined period. In this manner, the previous device is constantly informed of the communications in progress.

According to another implementation, the periodic emission of WAIT symbols is interrupted by the reception of data other than WAIT symbols from the next device. In this manner, the emission of WAIT symbol is maintained until a previous device waits for receiving data and then, the emission is stopped.

According to another implementation, an absence of receiving a WAIT symbol by a device from its next device during a second determined period triggers the configuration as said device becoming the terminal device of the segment. In this manner, any topology change is dynamically managed.

According to another implementation, the second determined period is at least larger than or equal to twice the first determined period. In this manner, so that an absence of receiving a WAIT symbol is efficiently detected.

According to another implementation, a second concentrator is placed ay the other end of the ordered communication segment. In this manner, all the nodes or concentrators of the segment are placed between the two concentrators and may send back information to the first concentrator at the beginning of the segment.

According to another implementation, the data contains a specific field, which is incremented when the data go across a device of the segment, so that its value is representative to the range of each device in the segment. In this manner, each device may mark its presence on the segment and may be situated in the ordered communication segment. Moreover, each device is informed of the presence of all the others devices of the segment.

According to another implementation, the value of the specific field is modified whichever the direction of the data transmission, so that each node knows its range in the ordered communication segment whichever the direction of the super-frame transmitted through the segment.

According to another implementation, each device comprises at least two communication means for transmitting the data to the following devices, the data being transmitted by the at least two communications means like different cables, thereby increasing the efficiency of the transmission of data through the segment.

According to another implementation, the communication method comprises a step of an intermediary device emitting to the next device by using only one communication means as long as the device receives WAIT symbols from this next device during the last frame cycle, a step of a device emitting to the next device by using the at least two communication means when the device did not receive any WAIT symbol from this next device during the last frame cycle. In this manner, if a wired link is cut, a device tries to reach the next device by another wired link.

According to another aspect, the disclosure proposes program code instructions for implementing the steps of the method disclosed above, when said program is executed on a computer or a central unit.

According to another aspect, the disclosure proposes a non-transitory computer-readable carrier medium storing a program which, when executed by a computer or a central unit, causes the computer or the central unit to carry out the steps of the method disclosed above.

According to another aspect, the disclosure propose a communication device implemented in a communication network comprising a plurality of devices forming a ordered communication segment, at least one device of the segment being connected to at most two other devices called previous device and next device, said communication device having a first communication means for exchanging data with a previous device and a second communication means for exchanging at least these data with a next device allowing the propagation of the data on the segment. The communication means receives a first symbol EOSF from the previous device, this reception activating the emission of WAIT symbols by the first communication means to the previous device and the emission of at least the first symbol to the next device by the second communication means.

4. BRIEF DESCRIPTION OF THE DRAWINGS

Other features and advantages of embodiments of the disclosure shall appear from the following description, given by way of an indicative and non-exhaustive example and from the appended drawings, of which:

FIGS. 4A to 4I illustrate an exemplary succession of data transmitted on a segment when a line cut is detected according to a variant of the disclosure, wherein:

FIG. 4A shows a transmission of data on a segment at a first time;

FIG. 4B shows a transmission of data on a segment at a second time;

FIG. 4C shows a transmission of data on a segment at a third time;

FIG. 4D shows a transmission of data on a segment at a fourth time;

FIG. 4E shows a transmission of data on a segment at a fifth time;

FIG. 4F shows a transmission of data on a segment at a sixth time;

FIG. 4G shows a transmission of data on a segment at a seventh time;

FIG. 4H shows a transmission of data on a segment at a eighth time;

FIG. 4.I shows a transmission of data on a segment at a last time.

5. DETAILED DESCRIPTION

In all of the figures of the present document, identical elements and steps are designated by the same numerical reference sign.

Figure 1:
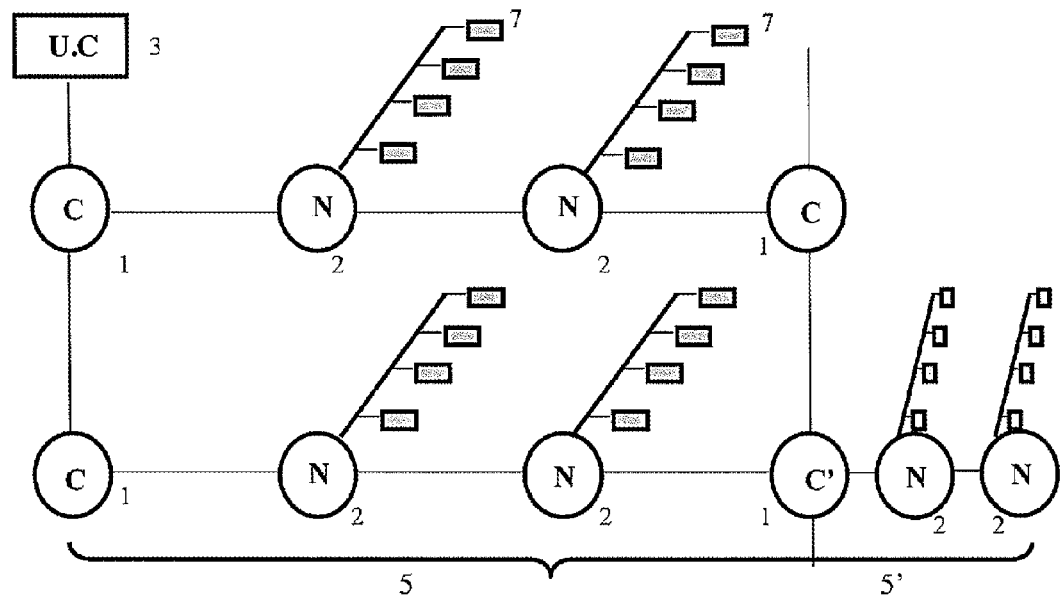
FIG. 1 depicts an example of data acquisition system comprising a wired communication network.

FIG. 1 illustrates a data acquisition system such as a network used for example in a seismic data acquisition network where nodes exchange data via wired link or wireless communication. According to this embodiment, the communication network includes nodes 2 which are connected to one or several seismic sensors 7, and concentrators 1. A set of a plurality of nodes surrounded by concentrators at each end is called a segment 5. A node 2 may also end a segment 5'. Concentrators 1 communicate with a master central unit U.C 3 that controls all devices 1, 2 and centralizes the data transmitted over the communication network. Each concentrator locally manages communication on its segment, and provides the power supply to the nodes. The master central unit 3 collects all data from the seismic sensors 7 through the nodes 2 and the concentrators 1.

According to a preferred embodiment with a wired system, physically, the wired link segment includes 2 pairs of wires: a first pair is preferentially used for data transfer, for example with a Half-duplex protocol, and the two pairs provide power supply to the connected devices on the segment. One skilled in the art would understand that the method is not limited to two communication pairs. In case of a wireless system, nodes are wirelessly connected one to another by radiofrequency connection means such as and non limited to Wi-Fi, Bluetooth, radio transmission . . . . The communication network may be used on land or sea, in the latter case the UC 3 is generally on board a ship.

Figure 2:
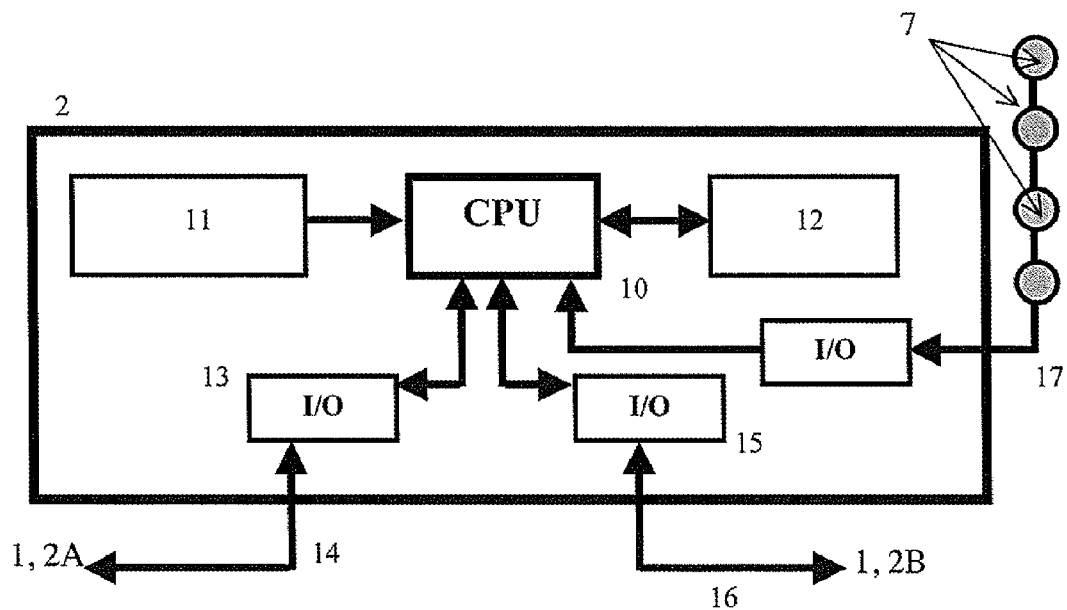
FIG. 2 depicts a block diagram of a node, according to an embodiment.

FIG. 2 shows a block diagram of a node 2. Such device includes a Central Processing Unit CPU 10, running a computer program read from a program memory 11, and processing data stored in a data memory 12, a flash memory or a hard disk for example. The node 2 has a first input output interface 13 for communication via a line 14, with at least one previous node 2A, or the concentrator 1 at the beginning of the segment. The node 2 has a second input output interface 15 via a line 16 for communication with at least one next node 2B, or the concentrator 1 at the end of the segment 5. The node 2 includes also an input port 17 for receiving signal from one or more sensors 7. The power supply is provided by the wired link 14 or 16. An example of power devices and data communication is described in FR 2938928.

A concentrator 1 includes similar elements as a node 2 with additional elements, like a third communication interface for a high bandwidth connection via a transverse line, allowing a fast transmission of data to the master central unit 3. In a general manner, a node and a concentrator are communication devices comprising at least a CPU running a computer program and communication means for receiving data and transmitting data.

The network described by FIG. 1 is constantly changing depending on the addition and deletion of nodes and associated sensors, and line cuts or wireless communication failure. The changes are detected at the level of the segment, by the concentrator. According to a preferred embodiment, the concentrator initializes the emission of a frame of data that is propagated through all the segment devices and that comes back with a set of information retrieved from the nodes. By processing the received information, the concentrator 1 may in particular determine the topology of its segment.

Figure 3:
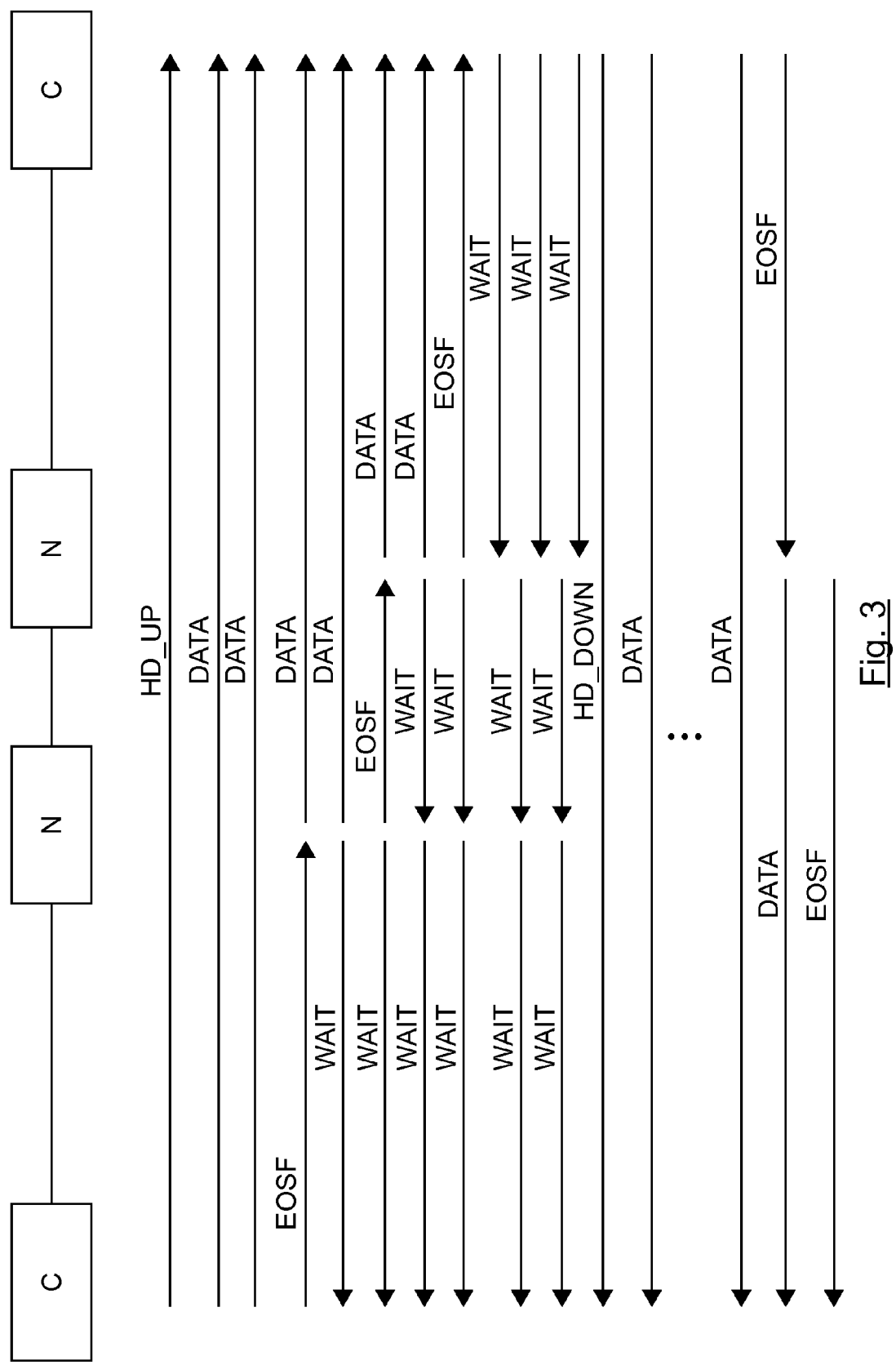
FIG. 3 depicts a exemplary succession of data transmitted on a segment for illustrating the main steps of the communication method according to an embodiment of the present disclosure.

FIG. 3 shows the exemplary succession of data transmitted on a segment for illustrating the main steps according to an embodiment of the present disclosure.

At first, a super frame of data called "HD-Up" is sent by the concentrator 1 (at the left of the FIG. 3) via the wired link 14, the super frame "HD-UP" is propagated through the segment. The super-frame HD-Up comprises at least:

an identifier of super frame HD-Up (first bytes of the super frame),
several data fields for initializing the communication in the segment,
a symbol of "End Of Super Frame" (EOSF).

The super-frame is split in temporal slots and sent to the first node N1. The super-frame is received by the first input output interface 13 of node N1. The content of the super-frame is stored in the data memory 12 of the node. Upon reception of the EOSF symbol, the node N1 activates a module stored in the program memory 11 for periodically sending WAIT symbols on the first input output interface 13. The emissions of a WAIT symbol to the concentrator 1 are spaced out of duration less than a first determined period, typically 10 milliseconds. In this way, the concentrator periodically receives data from the next device and may deduce that the wired link is in working order.

Then, node N1 emits the super-frame HD-Up to the next node N2 by using the second input output interface 15 and the wired link 16. According to a particular embodiment, the super-frame HD-Up is enriched by information specific to each crossed node, this information identifying the node.

The first node N1 receives the super-frame HD-Up and extracts data useful to its running. The first node N1 sends the super-frame HD-Up to the next node with a new data field with its second input output interface 15. The new data field contains an indicator of presence of node N1 on the segment. Typically, the first data field contains a bit that is initialized to "1" by node N1. The second node N2 receives the super-frame with its first input output interface 13, and extracts data useful to its running. Following the reception of symbol EOSF, the node N2 activates a module stored in its program memory 11 for periodically sending WAIT symbols on the first input output interface 13. The WAIT symbols sent by N2 are received by N1 via the link. The node N2 also modifies the field specifying the range of each device in the segment. For example, the concentrator sending the super-frame initializes this specific field with the value "000", then each node receiving the super-frame, reads its value and adds one unit to this value before to re-send the super-frame. At the end of the crossing of the super-frame through the segment, the value of specific field corresponds to the number of nodes of this segment. In this manner, by analyzing the plurality of data fields to find a free field, each node knows its rank in the ordered succession of nodes.

At the end of the segment, a second concentrator C' receives the super-frame HD-Up. In response to the reception of HD-Up, C' builds a super-frame HD-Down with internal data. If C' is not able to send back the super-frame HD_Down into the first delay after the reception of EOSF symbol, C' sends WAIT symbols. The last node of the segment managed by C receives the super-frame HD_Down. The reception of the first byte of HD-Down stops the periodical emission of WAIT symbols. The HD_Down is sent back to node N1, and the node N2 becomes inactive, i.e. it does not send data anymore. In the same way as the HD-Up, the super-frame HD-Down contains also a specific field specifying the range of each device in the segment.

Finally, concentrator C receives the super-frame HD-Down. By reading the value of specific field, C knows the number of nodes in its segment.

According to an embodiment, the data fields are written with an identifier of each node. That allows specifically pointing a node when the concentrator wants to send it a command.

If there is no concentrator to end the segment 5', the last node does not know it is the last. It sends the HD_Up and waits for receiving a WAIT symbol from the next node. If no WAIT symbol arises during at least a predetermined period, for example twice the duration between two WAIT symbols emission, this node determines itself to be the last node of the segment. In particular, a timer with a determined duration is launched at the emission of data on a communication means and when the determined duration ends, if the communication means have not received any data, then the node is considered as the last. In this case, it sends the super-frame HD_Down on the first input output interface 13 and then, it stops its emission of WAIT symbols; it acts as above second concentrator C'.

In the case of a line cut during the transmission of super-frame HD_Up or HD_Down, a node does not receive anymore WAIT symbols and therefore, determines itself as the last node. In the same way, this node sends the super-frame HD_Down on the first input output interface 13 and then, it stops its emission of WAIT symbols.

After the transmission of super-frames HD_Up and HD_Down, the concentrator at the beginning of a segment initializes others super-frames that go across the segment. In this manner, the measurements performed by the seismic sensors may be retrieve at any time.

FIG. 4 shows an exemplary succession of data transmitted on a segment when a line cut occurs, considering a wired system. One skilled in the art would understand that this example could be easily transposed to a wireless system, the wires being replaced by transmitting frequencies for instance.

According to this embodiment, the links 14 and 16 comprise two pairs of wires for communication and power supply. Concerning the communication, the pairs are redundant and only one pair is sufficient to transmit data: communication mode named "Xb", wherein devices emit and receive data on two pairs simultaneously, is preferably avoided in view of the electrical power consumption since devices such as nodes do not have their own power supply. In the embodiment, the devices emit data on a single pair called "favored" according to a communication mode named "X" mode, even if they could also emit data on two pairs (Xb mode) or only on the other pair. In the example illustrated by FIG. 4, the segment comprises a concentrator C, and three nodes successively designated N1, N2 and N3. The node N3 is connected to previous node N2.

Figure 4A:
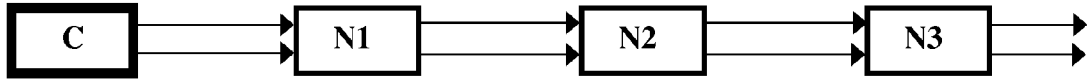

At the initialization of the communication of the segment, as shown in FIG. 4A, the concentrator C emits to the node N1 the frame HD_Up in Xb mode, data is transmitted on two communication ports for dialogue with N1. A concentrator is connected to an external battery (or other power supply) and may emit on its two communication ports. At the initialization of the segment, the nodes N1, N2 and N3 which are power supplied by C, transmit the frame HD_Up to the next node by using the two pairs of communication wires (i.e. Xb mode). On the FIG. 4A to 4I, the communication between two devices by Xb mode is shown by two in or out arrows, communication mode X is shown by a single arrow. To simplify the figures, the emissions of WAIT symbols are not represented. At the initialization of the segment, N3 does not know that no other node is connected to it and that is the end node of the segment. It is the reason why it tries to reach a neighbor node with the Xb mode.

Figure 4B:
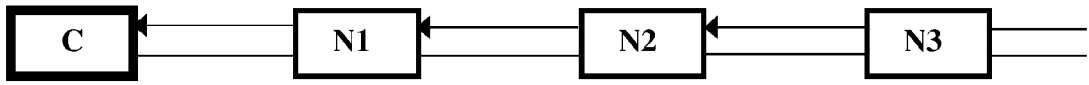

FIG. 4B shows the return of the HD_Up frame as the HD_Down. Node N3 detects that it has not received any data sent by a next node, so node N3 is set in the configuration of a terminal node and sends back the frame HD_Down. Nodes N1 and N2 propagate and enrich the frame HD_Down to concentrator C in the X mode.

Figure 4C:
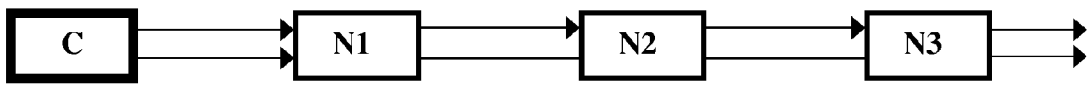

FIG. 4C shows the emission by C of a new frame HD-UP to the segment. The nodes N1 and N2 emit this frame in X mode as they had detected a neighbor node in the previous cycle. Node N3 that had not detected any response from a next node on one pair of wires, tests if it can reach a device in Xb mode. N3 emits the frame HD_Up by communication mode Xb, with the other input output interface.

Figure 4D:
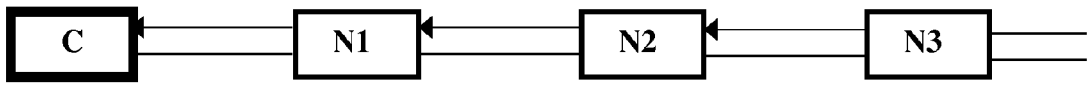

No data is received on the other input output interface, so N3 is still considered as a terminal node of the segment and sends back the frame HD_Down as shown by FIG. 4D. Nodes N1 and N2 propagate HD_Down by communication mode X to concentrator C.

Figure 4E:
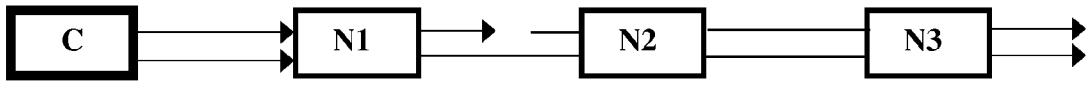

When a wire cut occurs on the favored pair between N1 and N2, as shown in FIG. 4E, the propagation of the HD_Up frame on the segment stops just after N1, and N2 does not receive this frame. N1 receives no WAIT symbol on its input output interface other communication port and configures itself in terminal mode configuration.

Figure 4F:
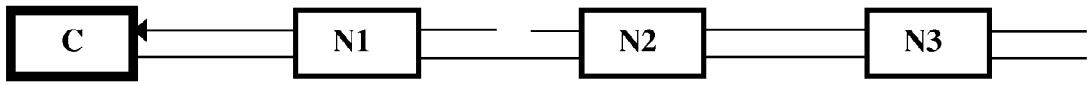

N1, being the new terminal node, returns the frame HD_Down on its preferred pair as shown in FIG. 4F. the frame HD_Down is received in X mode by the concentrator C.

Figure 4G:
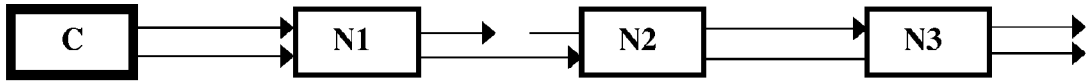

FIG. 4G shows the emission by C of a new frame HD_Up to node N1. As having not detected any neighbor in the previous cycle, N1 emits the new frame HD_Up in Xb mode to try to reach N2 through all the wires. N2 receives the frame HD_Up on the other pair and considers that it is now the way it communicates with its previous node. It emits the frame HD_Up to node N3 by communication mode X.

Figure 4H:
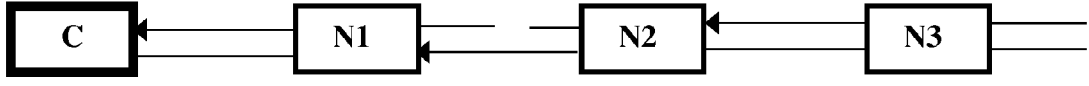

FIG. 4H shows the emission by the N3 of the frame HD_Down frame to N2 by communication mode X. N2 emits the frame HD_Down to N1 on the other pair, i.e. the pair having received the frame HD_Up from N1. N1 detects the reception of HD_Up frame on its other pair and deduces that it is not the terminal node of the segment. The frame HD_Down is finally received by the concentrator C.

Figure 4I:
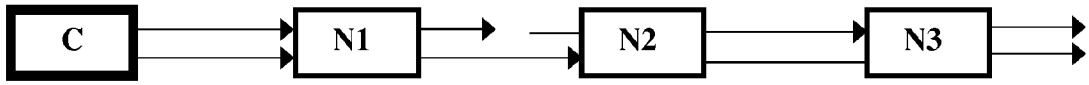

FIG. 4I shows the emission by C of a new frame HD_Up to the node N1. N1 emits the frame by protocol mode Xb, but the frame is received by N2 by one pair only. N2 emits the frame HD_Up to node N3 frame by communication mode X.

Frames HD_Down and HD_Up are thus transmitted through the segment, from one end to the other end, despite partial wire cuts.

Although the present disclosure has been described with reference to the illustrated embodiments, it is in no way limited by these embodiments. It will indeed be noted that any means of navigation equivalent to direction buttons is applicable to the implementation of the disclosure.

The invention claimed is:

1. A communication method in a communication network comprising an ordered communication segment of devices, said segment comprising a first and a second terminal devices ending the segment and at least one intermediary device, wherein said intermediary device is connected to at most two other devices of the segment, called a previous device and a next device, receives data from the previous device and emits at least these data to the next device, allowing propagation of the data on the segment, the first terminal device being a concentrator initializing transmission of a first frame of data through the segment to the second terminal device, said second terminal device sending back a second frame of data downstream to the concentrator through the segment;
    wherein the communication method comprises the following acts carried out by at least an intermediary device: reception of a first symbol EOSF from the previous device of said intermediary device, periodic emission of WAIT symbols to the previous device of said intermediary device, said periodic emission being triggered by reception of a first symbol, and emission of at least the first symbol EOSF to the next device of said intermediary device, and
    wherein the periodic emission of WAIT symbols is interrupted by reception of determined data other than WAIT symbols from the next device.

2. The method according to claim 1, wherein emission of WAIT symbols is periodically spaced out of a duration less than a first determined period.

3. The method according to claim 1, wherein an absence of reception of a WAIT symbol from the next device during a second determined period triggers a definition of said intermediary device as being the second terminal device of the segment.

4. The method according to claim 3, wherein the second determined period is at least larger than or equal to twice the first determined period.

5. The method according to claim 1 wherein the second terminal device is a second concentrator.

6. The method according to claim 1, further comprising changing the data received from the previous device by modifying a determined field when the data goes across the intermediary device of the segment, the value of this determined field being representative to the range of said intermediary device in the segment.

7. The method according to claim 6, wherein the value of the determined field is modified whichever the direction of the data transmission.

8. The method according to claim 1 wherein each device comprises at least two communication ports for transmitting the data to the following devices by different cables, the data being transmitted by the at least two communication ports.

9. The method according to claim 1 wherein each device comprises at least two communication ports for transmitting the data to the following devices by different cables, the data being transmitted by the at least two communications ports, and wherein an absence of reception of a WAIT symbol from the next device during a second determined period triggers the definition of said intermediary device as being the second terminal device of the segment, and further comprising the emission by said intermediary device to the next device by using only one communication port as long as said intermediary device receives WAIT symbols from this next device during the last cycle, and the emission by said intermediary device to the next device by using the at least two communication ports when said intermediary device did not receive WAIT symbols from this next device.

10. A non-transitory computer-readable medium storing a computer program comprising program code instructions which, when executed on a computer or a processor, implement a method for managing communication in a communication network comprising an ordered communication segment of devices, said segment comprising a first and a second terminal devices ending the segment and at least one intermediary device, wherein said intermediary devices is connected to at most two other devices of the segment, called previous device and next device, receives data from the previous device and emits at least these data to the next device, allowing the propagation of the data on the segment, the first terminal device being a concentrator initializing the transmission of a first frame of data through the segment to the second terminal device, said second terminal device sending back a second frame of data downstream to the concentrator through the segment;
  wherein the instructions configure the intermediary device to carry out the following acts of the method:
  reception of a first symbol EOSF from the previous device of said intermediary device, periodic emission of WAIT symbols to the previous device of said intermediary device, said periodic emission being triggered by reception of a first symbol, and emission of at least the first symbol EOSF to the next device of said intermediary device,
  wherein the periodic emission of WAIT symbols is interrupted by reception of determined data other than WAIT symbols from the next device.

11. A communication device implemented in a communication network comprising a plurality of devices forming a ordered communication segment, at least one device of the segment being connected to at most two other devices called previous device and next device, the communication device comprising:
  a first communication port for exchanging data with a previous device and a second communication port for exchanging at least these data with a next device allowing propagation of the data on the segment, wherein said first communication port is adapted to receive a first symbol EOSF from the previous device and to periodically emit WAIT symbols to said previous device, said second communication port is adapted to emit at least said first symbol EOSF to the next device, the reception of said first symbol activating the periodic emission of WAIT symbols and the emission of said at least first symbol EOSF,
  wherein the periodic emission of WAIT symbols is interrupted by reception of determined data other than WAIT symbols from the next device.

* * * * *